K. BÖTTCHER.
WEIGHING MACHINE.
APPLICATION FILED DEC. 16, 1907.
928,491.
Patented July 20, 1909.
Fig. 1.
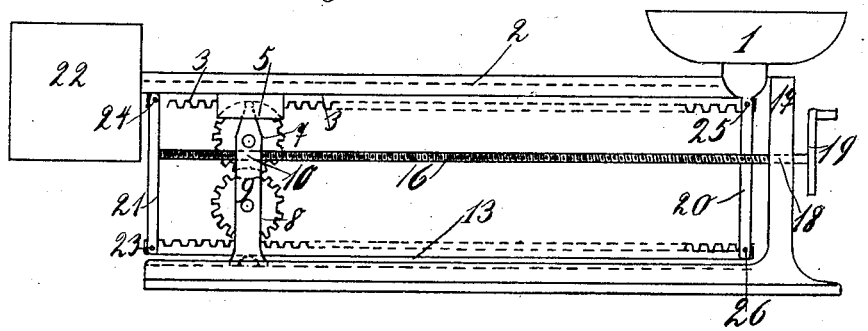
Fig. 2.
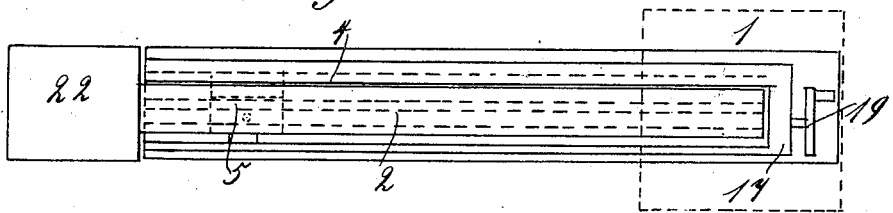
Fig. 3.
Schnitt C-D
Fig. 4.
Schnitt A-B
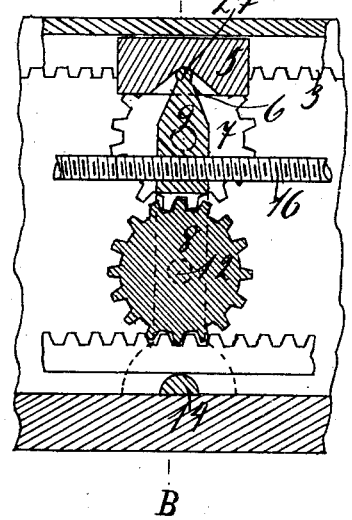
Witnesses:
Hans Ernst.
Elsa Haupt.
Inventor:
Karl Böttcher

UNITED STATES PATENT OFFICE.

KARL BÖTTCHER, OF BERLIN, GERMANY.

WEIGHING-MACHINE.

No. 928,491.  Specification of Letters Patent.  Patented July 20, 1909.

Application filed December 16, 1907. Serial No. 406,689.

*To all whom it may concern:*

Be it known that I, KARL BÖTTCHER, a subject of the King of Prussia, residing at Berlin, in the Kingdom of Prussia, German Empire, have invented certain new and useful Improvements in Weighing - Machines; and I do hereby declare the following to be a full, clear, and exact description of the invention, such as will enable others skilled in the art to which it appertains to make and use the same.

The subject of my invention is a weighing machine which renders the use of numerous weights superfluous, whereby much time is saved.

My new machine differs from prior weighing machines in which a number of weights are dispensed with, inasmuch as I employ a movable balance-point for the scale-beam, while the previous machines have a sliding weight on the scale-beam. With my method it is not necessary, as with prior apparatus, first to adjust a heavy weight and then to obtain the decimals by using a small weight.

The whole procedure of weighing on my method consists simply in moving the balance-point of the scale-beam into that position in which the scale-beam lies horizontally, and in then reading off the weight on a scale.

My invention is illustrated in the accompanying drawing, in which—

Figure 1 is an elevation, Fig. 2 a plan, Fig. 3 a fragmental longitudinal section, drawn on an enlarged scale, and Fig. 4 a cross section on the same scale as Fig. 3.

The machine is constructed as follows:— The scale-pan 1 and the weight 22 are secured to the scale-beam 2, one at each end. The beam 2 is connected by means of two bars 20, 21 with a rack 13, the points of connection 23, 24, 25, 26 being of the construction common to weighing apparatuses in which a minimum amount of friction is aimed at. The beam 2 serves partly as a guide for the dovetailed block 5 and partly as a rack 3. The dovetailed block 5 has a conical recess or crater 6 to receive the balance-point 27 for the beam 2. This point 27 is the apex of the support 9, whose base slides in a guideway 15 in the framework of the machine. This support receives the bearing-pins 11 and 12 of the toothed wheels 7 and 8, which gear with each other. The upper wheel 7 also meshes partly with the rack 3 of the beam 2 and partly with the stationary rack 4 of the framework, which latter rack is parallel with the scale-beam in the horizontal position of the latter. The lower toothed wheel 8 meshes with the rack 13, connected as already described with the beam 2. The rack 13, beam 2, and bars 20, 21, it will be observed, constitute a parallelogram. The rack 13 is balanced on a semi-cylindrical block 14, which forms the foot of the support 9 and slides in the guideway 15.

The toothed wheels 7, 8 can have bearings on both sides, the one bearing-pin being mounted in the support 9, while the other runs in a horizontal guideway in the framework. The latter has a threaded hole 10, through which there passes a screw-spindle 19, mounted at 18 in the end 17 of the framework. The screw-spindle has hand-wheel 19, by turning which the support can be caused to travel forward and backward in the guideway 15, carrying with it the toothed wheels 7, 8, and the dovetailed block 5 in which the balance-point 27 is accommodated.

The machine is used in the following manner:—The substance whose weight is to be determined is placed in the scale-pan 1 and the handle 19 turned until the beam 2 lies horizontally. The weight can then be read off on a scale which is fixed to the framework, each position of the support 9 corresponding, when the beam 2 is in horizontal position, with a certain weight of the substance in the pan 1. If decimal readings are required, a circular scale may be provided for the traversing-screw 16.

Having thus described my invention, I declare that what I claim is—

1. A weighing machine, comprising, in combination, a framework whose base presents a guideway, a support having a tapped hole sliding in said guideway and presenting a balance-point above and a balance-foot below, a terminally weighted beam carrying a pan and presenting a dovetailed guideway and a rack, a second rack balanced on the foot of the support, arms jointing the two racks together, intermeshing gears mounted on the support and engaging one with each rack, a recessed and dovetailed block sliding in the guideway of the beam and accommodating and resting on the balance-point of the support, and a traversing-screw mounted in the framework and passing through the hole in the support, substantially as described.

2. A weighing machine, comprising, in combination, a framework whose top presents a rack and whose base presents a guideway, a support having a tapped hole sliding in said guideway and presenting a balance-point above and a balance-foot below, a terminally weighted horizontal beam carrying a pan and presenting a dovetailed guideway and a rack lying flush with the first said rack, a third rack balanced on the foot of the support, arms jointing the last said rack with the beam-rack, intermeshing gears mounted on the support and engaging one with the framework and beam-racks and the other with the third rack, a recessed and dovetailed block sliding in the guideway of the beam and accommodating and resting on the balance-point of the support, and a traversing-screw mounted in the framework and passing through the hole in the support, substantially as described.

In testimony whereof I affix my signature in presence of two witnesses.

KARL BÖTTCHER.

Witnesses:
    HANS ERNST,
    ELSA HAUPT.